(12) United States Patent
Wu

(10) Patent No.: US 7,534,039 B2
(45) Date of Patent: May 19, 2009

(54) VACUUM PACKAGING FILMS PATTERNED WITH PROTRUDING CAVERNOUS STRUCTURES

(75) Inventor: Hongyu Wu, San Jose, CA (US)

(73) Assignee: Sunbeam Products, Inc., Boca Raton, FL (US)

( * ) Notice: Subject to any disclaimer, the term of this patent is extended or adjusted under 35 U.S.C. 154(b) by 423 days.

(21) Appl. No.: 11/185,450

(22) Filed: Jul. 19, 2005

(65) Prior Publication Data

US 2006/0073291 A1 Apr. 6, 2006

Related U.S. Application Data

(60) Provisional application No. 60/590,981, filed on Jul. 22, 2004.

(51) Int. Cl.
*B65D 33/00* (2006.01)
*B65D 33/16* (2006.01)
*B65D 30/08* (2006.01)

(52) U.S. Cl. .......................... 383/105; 383/63; 383/109

(58) Field of Classification Search ................... 383/63, 383/105, 100–103, 109
See application file for complete search history.

(56) References Cited

U.S. PATENT DOCUMENTS

| 274,447 | A | 3/1883 | Kennish |
|---|---|---|---|
| 1,938,593 | A | 12/1933 | Jarrier |
| 2,085,766 | A | 7/1937 | Potdevin et al. |
| 2,105,376 | A | 1/1938 | Scott |
| 2,265,075 | A | 12/1941 | Knuetter |
| 2,387,812 | A | 10/1945 | Sonneborn et al. |
| 2,429,482 | A | 10/1947 | Munters |
| 2,480,316 | A | 8/1949 | Blair et al. |
| 2,607,712 | A | 8/1952 | Sturken |
| 2,609,314 | A | 9/1952 | Engel et al. |
| 2,633,442 | A | 3/1953 | Caldwell |
| 2,642,372 | A | 6/1953 | Chittick |
| 2,670,501 | A | 3/1954 | Michiels |
| 2,690,206 | A | 9/1954 | Mueller |
| 2,695,741 | A | 11/1954 | Haley |
| 2,759,866 | A | 8/1956 | Seymour |
| 2,772,712 | A | 12/1956 | Post |
| 2,776,452 | A | 1/1957 | Chavannes |

(Continued)

FOREIGN PATENT DOCUMENTS

EP 0 723 915 7/1966

(Continued)

*Primary Examiner*—Jes F. Pascua
(74) *Attorney, Agent, or Firm*—Lawrence J. Shurupoff

(57) ABSTRACT

The present invention teaches a film having a pattern of protruding structures. When used in the vacuum packaging bag material context, the result is a vacuum packaging bag that a consumer can effectively evacuate and hermetically seal. The protruding structures tend to form channels that enable gas to evacuate from within a vacuum packaging bag. In certain embodiments, the protruding structures are formed only on an inner side of the vacuum packaging film, typically through a hot casting or heat-extrusion process. As a result, far less bag material is required than in the prior art patterned film formed through cold embossing processes. The present invention also contemplates a variety of applications for the films, including preformed bags and bag rolls, as well as a variety of apparatus for manufacturing the films and appliances for utilizing the bags and bag rolls.

11 Claims, 10 Drawing Sheets

U.S. PATENT DOCUMENTS

| | | | |
|---|---|---|---|
| 2,778,173 A | 1/1957 | Taunton |
| 2,789,609 A | 4/1957 | Post |
| 2,821,338 A | 1/1958 | Metzger |
| 2,856,323 A | 10/1958 | Gordon |
| 2,858,247 A | 10/1958 | De Swart |
| 2,913,030 A | 11/1959 | Fisher |
| 2,916,411 A | 12/1959 | Villoresi |
| 2,960,144 A | 11/1960 | Graf |
| 3,026,231 A | 3/1962 | Chavannes |
| 3,060,985 A | 10/1962 | Vance et al. |
| 3,077,262 A | 2/1963 | Gaste |
| 3,077,428 A | 2/1963 | Heuser et al. |
| 3,098,563 A | 7/1963 | Skees |
| 3,102,676 A | 9/1963 | Danelli et al. |
| 3,113,715 A | 12/1963 | Pangrac |
| 3,135,411 A | 6/1964 | Osborne |
| 3,141,221 A | 7/1964 | Faulls, Jr. |
| 3,142,599 A | 7/1964 | Chavannes |
| 3,149,772 A | 9/1964 | Olsson |
| 3,160,323 A | 12/1964 | Weisberg |
| 3,224,574 A | 12/1965 | McConnell et al. |
| 3,237,844 A | 3/1966 | Hughes |
| 3,251,463 A | 5/1966 | Bodet |
| 3,325,084 A | 6/1967 | Ausnit |
| 3,334,805 A | 8/1967 | Halbach |
| 3,381,887 A | 5/1968 | Lowry |
| 3,411,698 A | 11/1968 | Reynolds |
| 3,423,231 A | 1/1969 | Lutzmann |
| 3,516,217 A | 6/1970 | Gildersleeve |
| 3,533,548 A | 10/1970 | Taterka |
| 3,565,147 A | 2/1971 | Ausnit |
| 3,575,781 A | 4/1971 | Pezely |
| 3,595,467 A | 7/1971 | Goglio |
| 3,595,722 A | 7/1971 | Dawbam |
| 3,595,740 A | 7/1971 | Gerow |
| 3,600,267 A | 8/1971 | McFedries, Jr. |
| 3,661,677 A | 5/1972 | Wang |
| 3,785,111 A | 1/1974 | Pike |
| 3,799,427 A | 3/1974 | Goglio |
| 3,809,217 A | 5/1974 | Harrison |
| 3,833,166 A | 9/1974 | Murray |
| 3,895,153 A | 7/1975 | Johnston et al. |
| 3,908,070 A | 9/1975 | Marzolf |
| 3,937,395 A | 2/1976 | Lawes |
| 3,958,391 A | 5/1976 | Kujubu |
| 3,958,693 A | 5/1976 | Greene |
| 3,980,226 A | 9/1976 | Franz |
| 3,998,499 A | 12/1976 | Chiarotto |
| 4,018,253 A | 4/1977 | Kaufman |
| 4,066,167 A | 1/1978 | Hanna et al. |
| 4,098,404 A | 7/1978 | Markert |
| 4,104,404 A | 8/1978 | Bieler et al. |
| 4,105,491 A | 8/1978 | Haase et al. |
| 4,155,453 A | 5/1979 | Ono |
| 4,164,111 A | 8/1979 | Di Bernardo |
| 4,179,862 A | 12/1979 | Landolt |
| 4,186,786 A | 2/1980 | Kirkpatrick |
| 4,212,337 A | 7/1980 | Kamp |
| 4,215,725 A | 8/1980 | Callet et al. |
| 4,295,566 A | 10/1981 | Vincek |
| 4,310,118 A | 1/1982 | Kisida et al. |
| 4,340,558 A | 7/1982 | Hendrickson |
| 4,370,187 A | 1/1983 | Katagiri et al. |
| 4,372,921 A | 2/1983 | Sanderson et al. |
| 4,449,243 A | 5/1984 | Platel |
| 4,486,923 A | 12/1984 | Briggs |
| 4,532,652 A | 7/1985 | Herrington |
| 4,551,379 A | 11/1985 | Kerr |
| 4,569,712 A | 2/1986 | Shibano et al. |
| 4,575,990 A | 3/1986 | von Bismarck |
| 4,576,283 A | 3/1986 | Fafournoux |
| 4,576,285 A | 3/1986 | Goglio |
| 4,579,756 A | 4/1986 | Edgel |
| 4,583,347 A | 4/1986 | Nielsen |
| 4,658,434 A | 4/1987 | Murray |
| 4,669,124 A | 5/1987 | Kimura |
| 4,672,684 A | 6/1987 | Barnes et al. |
| 4,683,702 A | 8/1987 | Vis |
| 4,705,174 A | 11/1987 | Goglio |
| 4,712,574 A | 12/1987 | Perrott |
| 4,747,702 A | 5/1988 | Scheibner |
| 4,756,422 A | 7/1988 | Kristen |
| 4,756,629 A | 7/1988 | Tilman et al. |
| 4,778,282 A | 10/1988 | Borchardt et al. |
| 4,782,951 A * | 11/1988 | Griesbach et al. ........... 206/484 |
| 4,786,285 A | 11/1988 | Jambor |
| 4,812,056 A | 3/1989 | Zieke |
| 4,834,554 A | 5/1989 | Stetler, Jr. et al. |
| 4,841,603 A | 6/1989 | Ragni |
| 4,871,264 A | 10/1989 | Robbins, III et al. |
| 4,877,334 A | 10/1989 | Cope |
| 4,887,912 A | 12/1989 | Stumpf |
| 4,890,637 A | 1/1990 | Lamparter |
| 4,892,414 A | 1/1990 | Ausnit |
| 4,903,718 A | 2/1990 | Sullivan |
| 4,906,108 A | 3/1990 | Herrington et al. |
| 4,913,561 A | 4/1990 | Beer |
| 4,917,506 A | 4/1990 | Scheibner |
| 4,917,844 A | 4/1990 | Komai et al. |
| 4,941,310 A | 7/1990 | Kristen |
| 4,953,708 A | 9/1990 | Beer et al. |
| 4,973,171 A | 11/1990 | Bullard |
| 5,006,056 A | 4/1991 | Mainstone et al. |
| 5,040,904 A | 8/1991 | Cornwell |
| 5,048,269 A | 9/1991 | Deni |
| D320,549 S | 10/1991 | McKellar et al. |
| 5,053,091 A | 10/1991 | Giljam et al. |
| 5,063,639 A | 11/1991 | Boeckmann et al. |
| 5,080,155 A | 1/1992 | Crozier |
| 5,097,956 A | 3/1992 | Davis |
| 5,098,497 A | 3/1992 | Brinley |
| 5,111,838 A | 5/1992 | Langston |
| 5,121,590 A | 6/1992 | Scanlan |
| 5,142,970 A | 9/1992 | ErkenBrack |
| 5,203,458 A | 4/1993 | Cornwell |
| 5,209,264 A | 5/1993 | Koyanagi |
| D338,399 S | 8/1993 | Conte, Jr. |
| 5,240,112 A | 8/1993 | Newburger |
| 5,242,516 A | 9/1993 | Custer et al. |
| 5,246,114 A | 9/1993 | Underwood |
| 5,252,379 A | 10/1993 | Kuribayashi et al. |
| 5,332,095 A | 7/1994 | Wu |
| 5,333,736 A | 8/1994 | Kawamura |
| 5,339,959 A | 8/1994 | Cornwell |
| 5,352,323 A | 10/1994 | Chi |
| 5,362,351 A | 11/1994 | Karszes |
| 5,368,394 A | 11/1994 | Scott et al. |
| 5,371,925 A | 12/1994 | Sawatsky |
| 5,373,965 A | 12/1994 | Halm et al. |
| 5,397,182 A | 3/1995 | Gaible et al. |
| 5,402,906 A | 4/1995 | Brown et al. |
| RE34,929 E | 5/1995 | Kristen |
| D360,578 S | 7/1995 | Dees |
| 5,445,275 A | 8/1995 | Curley et al. |
| 5,450,963 A | 9/1995 | Carson |
| 5,480,030 A | 1/1996 | Sweeney et al. |
| 5,526,843 A | 6/1996 | Wolf et al. |
| 5,540,500 A | 7/1996 | Tanaka |
| 5,542,902 A | 8/1996 | Richison et al. |
| 5,544,752 A | 8/1996 | Cox |
| 5,549,944 A | 8/1996 | Abate |
| 5,551,213 A | 9/1996 | Koelsch et al. |
| 5,554,423 A | 9/1996 | Abate |
| 5,584,409 A | 12/1996 | Chemberlen |

| | | |
|---|---|---|
| 5,592,697 A | 1/1997 | Young |
| 5,620,098 A | 4/1997 | Boos et al. |
| 5,638,664 A | 6/1997 | Levsen et al. |
| 5,655,273 A | 8/1997 | Tomic et al. |
| 5,689,866 A | 11/1997 | Kasai et al. |
| 5,699,936 A | 12/1997 | Sakamoto |
| 5,701,996 A | 12/1997 | Goto et al. |
| 5,709,467 A | 1/1998 | Galliano, II |
| 5,735,395 A | 4/1998 | Lo |
| 5,749,493 A | 5/1998 | Boone et al. |
| 5,765,608 A | 6/1998 | Kristen |
| 5,772,034 A | 6/1998 | Lin |
| 5,812,188 A | 9/1998 | Adair |
| 5,829,884 A | 11/1998 | Yeager |
| 5,839,582 A | 11/1998 | Strong et al. |
| 5,873,217 A | 2/1999 | Smith |
| 5,874,155 A | 2/1999 | Gehrke et al. |
| 5,881,881 A | 3/1999 | Carrington |
| 5,893,822 A | 4/1999 | Deni et al. |
| 5,898,113 A | 4/1999 | Vecere |
| 5,908,245 A | 6/1999 | Bost et al. |
| 5,915,596 A | 6/1999 | Credle, Jr. |
| 5,927,336 A | 7/1999 | Tanaka et al. |
| 5,928,762 A | 7/1999 | Aizawa et al. |
| D413,258 S | 8/1999 | Voller |
| 5,931,189 A | 8/1999 | Sweeney et al. |
| 5,941,421 A | 8/1999 | Overman et al. |
| 5,941,643 A | 8/1999 | Linkiewicz |
| 5,954,196 A | 9/1999 | Lin |
| 5,957,831 A | 9/1999 | Adair |
| 5,971,613 A | 10/1999 | Bell |
| 5,996,800 A | 12/1999 | Pratt |
| 6,021,624 A | 2/2000 | Richison et al. |
| 6,023,914 A | 2/2000 | Richison et al. |
| 6,029,810 A | 2/2000 | Chen |
| 6,030,652 A | 2/2000 | Hanus |
| 6,035,769 A | 3/2000 | Nomura et al. |
| 6,039,182 A | 3/2000 | Light |
| 6,045,006 A | 4/2000 | Frazier et al. |
| 6,045,264 A | 4/2000 | Miniea |
| 6,053,606 A | 4/2000 | Yamaguchi et al. |
| D425,786 S | 5/2000 | Voller |
| 6,059,457 A | 5/2000 | Sprehe et al. |
| 6,070,728 A | 6/2000 | Overby et al. |
| 6,074,677 A | 6/2000 | Croft |
| 6,076,967 A | 6/2000 | Beaudette |
| 6,089,271 A | 7/2000 | Tani |
| 6,105,821 A | 8/2000 | Christine et al. |
| 6,116,781 A | 9/2000 | Skeens |
| 6,161,716 A | 12/2000 | Oberhofer et al. |
| 6,164,826 A | 12/2000 | Petkovsek |
| 6,202,849 B1 | 3/2001 | Graham |
| 6,220,702 B1 | 4/2001 | Nakamura et al. |
| 6,224,528 B1 | 5/2001 | Bell |
| 6,227,706 B1 | 5/2001 | Tran |
| 6,231,234 B1 | 5/2001 | Gebhardt |
| 6,231,236 B1 | 5/2001 | Tilman |
| 6,274,181 B1 | 8/2001 | Richison et al. |
| D451,542 S | 12/2001 | Ishizawa et al. |
| 6,357,915 B2 | 3/2002 | Anderson |
| 6,402,873 B1 | 6/2002 | Fujii et al. |
| 6,408,872 B1 | 6/2002 | Skeens et al. |
| 6,423,356 B2 | 7/2002 | Richison et al. |
| 6,520,071 B1 | 2/2003 | Lanza |
| 6,550,966 B1 * | 4/2003 | Saad et al. .................. 383/103 |
| 6,715,644 B2 * | 4/2004 | Wilford ....................... 222/95 |
| 6,799,680 B2 * | 10/2004 | Mak ......................... 206/524.8 |
| 2001/0023572 A1 | 9/2001 | Savage et al. |
| 2004/0000501 A1 | 1/2004 | Shah et al. |
| 2004/0000502 A1 | 1/2004 | Shah et al. |
| 2004/0000503 A1 | 1/2004 | Shah et al. |
| 2004/0007494 A1 | 1/2004 | Popeil et al. |
| 2005/0238263 A1 * | 10/2005 | Ping ........................... 383/100 |
| 2005/0286808 A1 * | 12/2005 | Zimmerman et al. .......... 383/43 |

FOREIGN PATENT DOCUMENTS

| | | |
|---|---|---|
| EP | 0 836 927 | 4/1998 |
| EP | 1 053 945 | 11/2000 |
| JP | 8-90740 | 4/1966 |
| JP | 55-90364 | 7/1980 |
| JP | 62-192779 | 8/1987 |
| JP | 7-299865 | 11/1995 |
| JP | 9-131846 | 5/1997 |
| JP | 9-252919 | 9/1997 |
| JP | 10-34760 | 2/1998 |
| JP | 10-138377 | 5/1998 |
| JP | 11-77903 | 3/1999 |
| JP | 11-151142 | 6/1999 |
| JP | 10-180846 | 7/1999 |
| JP | 11-254631 | 9/1999 |
| JP | 2000-15767 | 1/2000 |
| JP | 2000-218746 | 8/2000 |
| KR | 20-0248033 | 5/1995 |
| WO | WO 00/71422 | 11/2000 |
| WO | WO 02/28577 A2 | 4/2002 |
| WO | WO 02/066227 A1 | 8/2002 |
| WO | WO 02/074522 A1 | 9/2002 |
| WO | WO 2004/078609 | 9/2004 |

* cited by examiner

VACUUM PACKAGING FILMS PATTERNED WITH PROTRUDING CAVERNOUS STRUCTURES

RELATED APPLICATION

This application claims priority to U.S. Provisional Patent Application No. 60/590,981, entitled "VACUUM PACKAGING FILM PATTERNED WITH PROTRUDING CAVERNOUS STRUCTURES" by Wu, filed on Jul. 22, 2004, and which is incorporated by reference in its entirety.

TECHNICAL FIELD

The invention relates to vacuum packaging bags for packaging products using a vacuum packaging appliance. In particular, the present invention teaches a patterned film for making sealable vacuum packaging bags and bag rolls, as well as methods and appliances for use therewith.

BACKGROUND OF THE INVENTION

Vacuum packaging film is used for vacuum sealing of perishable items. Due to the film's versatility in producing vacuum sealed packages of various sizes, its popularity has increased in recent years. As a result, continuous product improvement is required on the part of manufacturers in order to stay competitive. One such improvement has been applying patterns to vacuum packaging bags.

For vacuum packaging bags with smooth inner surfaces (i.e., inner surfaces that do not have a pattern), the bag surfaces sometimes stick together when air is evacuated from the bag during vacuum packaging. This may result in air pockets within the seal and degraded seal integrity. In response to this problem, manufacturers may imprint or emboss a pattern onto vacuum packaging film used to form the vacuum packaging bags. The pattern helps prevent vacuum packaging bag surfaces from sticking together during vacuum packaging by forming channels along the grooves of an imprinted pattern—or forming channels between raised portions of an embossed pattern—when the surfaces of the bag are face to face. The pattern may be applied to one or both of the inner surfaces of the vacuum packaging bag.

While imprinting or embossing a pattern onto vacuum packaging film is generally desirable, imprinting or embossing a pattern introduces new problems. For example, embossed patterns may be less durable than smooth surfaces. In general, the farther an embossed pattern sticks out from the surface of vacuum packaging film, the less durable the film becomes. Moreover, thicker embossing—or deeper grooves—typically consumes more material and may be harder to apply to or form into the film. Thicker embossing—or deeper grooves—also typically results in thicker vacuum packaging film, which makes the film heavier and less compact so it takes up more space in storage. Furthermore, if the surface of a vacuum packaging film has a high concentration of raised areas, there will be fewer channels formed when evacuating a vacuum packaging bag made of the film. Since there are fewer channels, even if relatively few channels become blocked gas may be trapped and air pockets formed, resulting in degraded seal integrity.

Accordingly, what is needed is a vacuum packaging film with an improved embossing pattern to reduce embossing thickness, to reduce the concentration of raised areas on vacuum packaging film, or to increase the number of channels formed when the vacuum packaging film is used in a vacuum packaging application.

SUMMARY OF THE INVENTION

The present invention teaches a variety of patterned films suitable for vacuum packaging applications, together with vacuum packaging bags, vacuum packaging bag rolls, and methods and apparatus for manufacturing the same.

A vacuum packaging bag that a user can place a product into, vacuum evacuate the vacuum packaging bag to a predefined vacuum level and hermetically seal through a predefined sealing process, the vacuum packaging bag includes, in accordance with a preferred embodiment, two sheets such that at least one of the two sheets has a patterned inner side and an outer side substantially without a pattern.

A multi-layer film suitable for use in forming a vacuum packaging bag, the multi-layer film, in accordance with another preferred embodiment, includes a patterned inner layer having a plurality of cavernous structures, the cavernous structures arranged in a pattern to form channels suitable for evacuation of gas when the multi-layer film is used to form a vacuum packaging bag. Also included is an outer layer coupled with the patterned inner layer, the outer layer having a substantially flat outer surface.

A vacuum packaging bag for holding food or other product, in accordance with yet another preferred embodiment, includes a first sheet formed of a multi-layer plastic film, the multi-layer plastic film further including a patterned inner layer having a plurality of cavernous structures. The cavernous structures are arranged in a first pattern to form channels suitable for evacuation of gas and an outer layer coupled with the patterned inner layer and the outer layer has a substantially flat outer surface. Also included is a second sheet, having a footprint similar to the first sheet, such that the first and second sheets are arranged with the patterned inner layer inside and facing the second sheet, the first and second sheets are sealed on opposing lateral sides and at an end side whereby the first and the second sheets form the vacuum packaging bag and have an opening for insertion of food or other product.

A bag roll suitable for forming vacuum packaging bags for holding food or other product, in accordance with another exemplary embodiment, includes a first sheet formed of a multi-layer plastic film. The multi-layer plastic film further includes a patterned inner layer having a plurality of cavernous structures that are arranged in a first pattern to form channels suitable for evacuation of gas and an outer layer coupled with the patterned inner layer having a substantially flat outer surface. Also included is a second sheet having a shape and size substantially similar to the first sheet The first and second sheets are arranged with the patterned inner layer facing inside. The first and second sheets are sealed on opposing lateral sides such that portions may be cut from the bag roll thereby creating a partially formed bag having opposing open ends that are sealable.

A method for manufacturing a multi-layer film, for use in vacuum packaging applications, having a pattern of protruding cavernous structures which operate to form channels suitable for evacuation of gas when the multi-layer film is used in the creation of a vacuum packaging bag, in accordance with yet another exemplary embodiment, includes heat-extruding a first material onto a spinning roll and heat-extruding a second material onto the spinning roll such that the first and second extruded materials bond and form first and second layers of the multi-layer film during a cooling of the first and second extruded materials. The method further includes applying the patter of protruding cavernous structures to the first and second layers in conjunction with the extrusion and the cooling of the first and second extruded materials such that the pattern is defined during the cooling of the first and second materials. The pattern is operable to form channels suitable for evacuation of gas from the vacuum packaging bag made of the multi-layer film, the pattern of protruding cavernous structure formed on only one side of the multi-layer film.

An apparatus for manufacturing a multi-layer film, for use in vacuum packaging applications, having a pattern of protruding cavernous structures that form channels suitable for evacuation of gas when the multi-layer film is used in the creation of a vacuum packaging bag, in accordance with another exemplary embodiment, includes a multi-layer extruder for extruding a first material and a second material and a cooling roll positioned with respect to the extruder such that the extruder applies the first and second materials onto a circumferential surface of the cooling roll such that the first and second extruded materials bond and form first and second layers of a first multi-layer film during a cooling of the first and second extruded materials. Also included is a pattern forming mechanism arranged to pattern the first and second layers during the extrusion and cooling of the first and second materials, the pattern of protruding cavernous structure formed on only one side of the multi-layer film.

A system for vacuum packaging a product within a vacuum packaging bag, in accordance with another exemplary embodiment, provides a vacuum packaging appliance for evacuating and sealing the vacuum packaging bag. The appliance includes a base defining an upper support surface adapted to receive an open end of a bag; a lid operatively associated with the base, the lid and the base defining a vacuum chamber therebetween to receive the open end of the bag and at least one gasket surrounding the vacuum chamber for directly engaging the bag such that the open end of the bag is operatively associated with the vacuum chamber. The appliance also includes a vacuum source operatively associated with the vacuum chamber for selectively evacuating the vacuum chamber and the operatively associated bag and a trough coupled to the base for receiving an open end of the bag and collecting contents taken from the bag while evacuating the bag, wherein a sealing mechanism is located adjacent to the trough in order to seal the evacuated bag. The system further includes bag material suitable for forming the vacuum packaging bag. The bag material includes a first sheet formed of a multi-layer plastic film having a patterned inner layer that has a plurality of cavernous structures. The cavernous structures are arranged in a first pattern to form channels suitable for evacuation of gas. The bag material also includes an outer layer coupled with the patterned inner layer such that the outer layer has a substantially flat outer surface. The system also includes a second sheet having a shape and size substantially similar to the first sheet such that the first and second sheets are arranged with the patterned inner layer facing inside and the first and second sheets are sealed on opposing lateral sides.

A vacuum packaging bag that a user can place a product into, vacuum evacuate the vacuum packaging bag to a predefined vacuum level and hermetically seal through a predefined sealing process, in accordance with a final exemplary embodiment, includes two sheets such that at least one of the two sheets has a patterned inner side including protruding structures. The protruding structures, formed during evacuation of the vacuum packaging bag, include primary evacuation channels that tend to form external to the protruding structures and secondary evacuation channels that tend to form internal to the protruding structures.

DETAILED DESCRIPTION

The present invention teaches a film having a pattern of protruding structures. When used in the vacuum packaging bag material context, the result is a vacuum packaging bag that a consumer can effectively evacuate and hermetically seal. The protruding structures tend to form channels that enable gas to evacuate from within a vacuum packaging bag. In certain embodiments, the protruding structures are formed only on an inner side of the vacuum packaging film, typically through a hot casting or heat-extrusion process. As a result, far less bag material is required than in the prior art patterned film formed through cold embossing processes. The present invention also contemplates a variety of applications for the films, including preformed bags and bag rolls, as well as a variety of apparatus for manufacturing the films and appliances for utilizing the bags and bag rolls.

Figure 1:
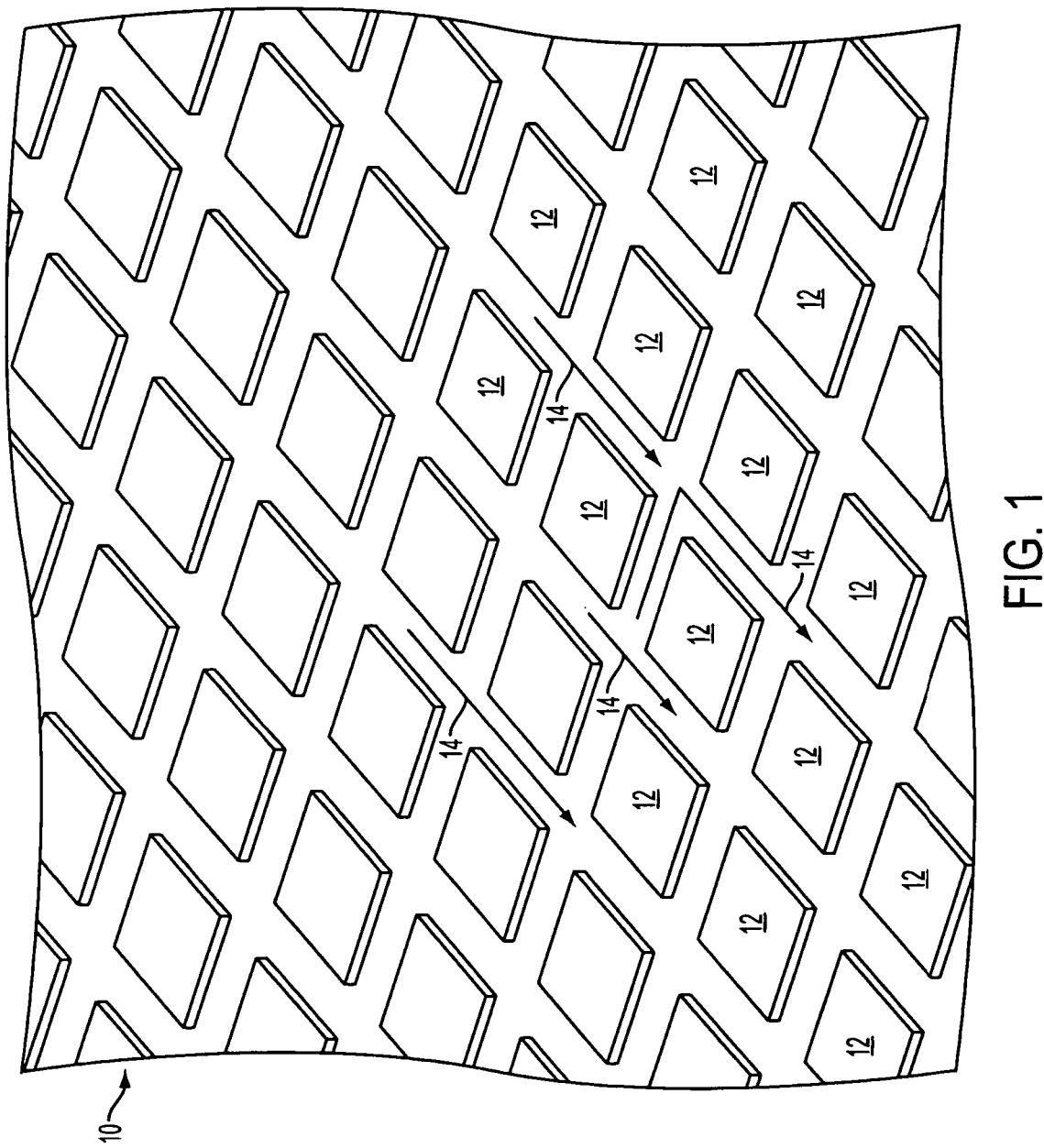
FIG. 1 illustrates a patterned film in accordance with a first embodiment of the present invention.

FIG. 1 illustrates a patterned film 10 in accordance with one embodiment of the present invention. The patterned film 10 is formed having a plurality of protruding structures 12. The protruding structures 12 of FIG. 1 are shown having a rectangular shape. While the rectangular shape is suitable, its presentation here is somewhat arbitrary for purposes of example. Other shapes such as cylindrical, rhomboid, etc., or even irregular will suffice to accomplish the desired goal of forming channels during evacuation.

With further reference to FIG. 1, the present invention contemplates, e.g., using the patterned film 10 in a vacuum packaging application having the protruding structures 12 on the inside surface of a vacuum packaging bag. During evacuation of the vacuum packaging bag, primary channels 14 enable effective evacuation of the vacuum packaging bag. The primary channels 14 tend to prevent gas from being trapped due to stored product and the collapse of the vacuum packaging bag. In one embodiment, the pattern of the protruding structures 12 is formed only on the inner layer of vacuum packaging bag through a hot casting process, described in more detail below.

Figure 2:
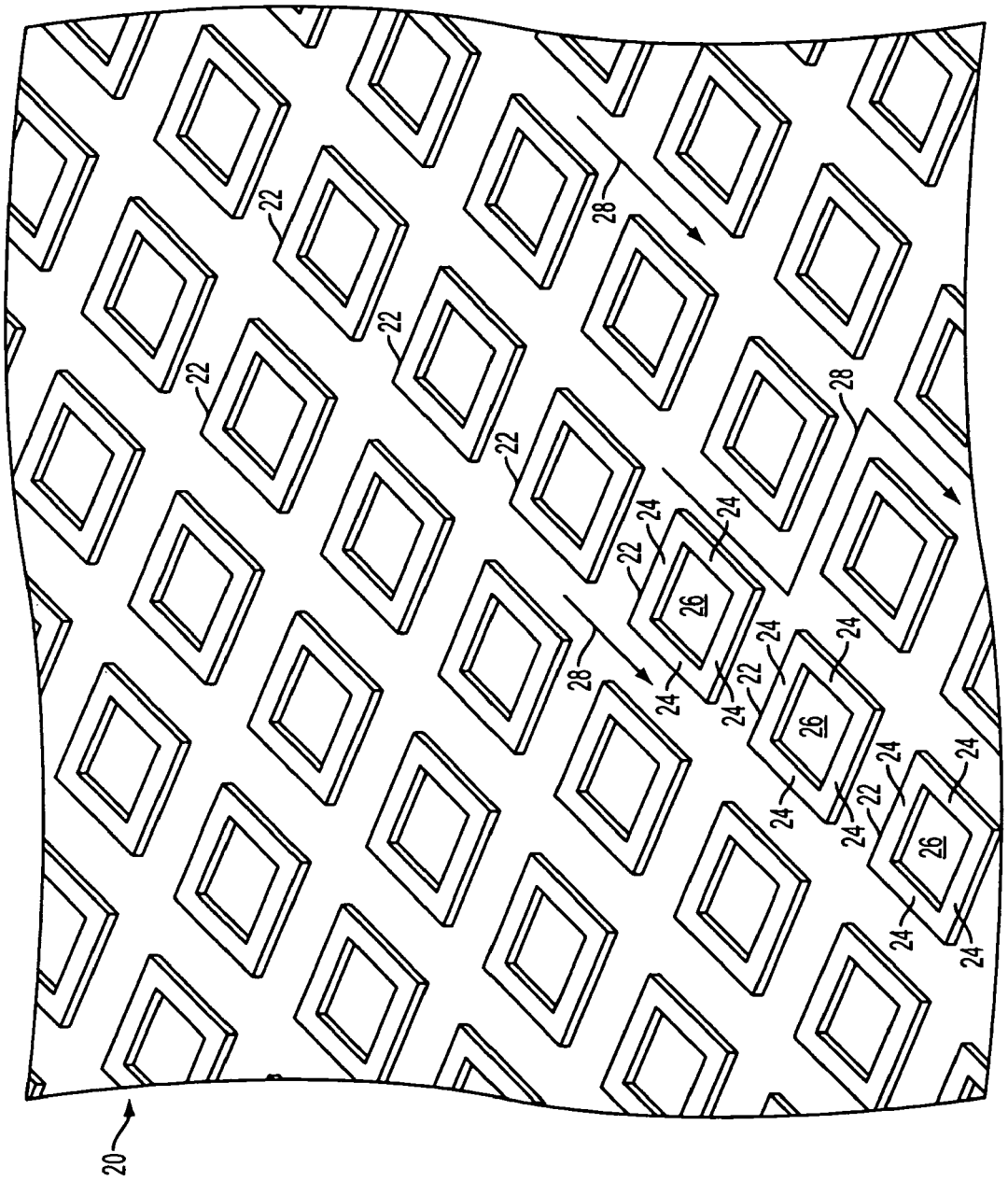
FIG. 2 illustrates a patterned film in accordance with a second embodiment of the present invention.

FIG. 2 illustrates a patterned film 20 according to another embodiment of the present invention. The patterned film 20 is formed with a plurality of protruding cavernous structures 22. Each of these protruding cavernous structures 22 are rectangular in a shape formed by walls 24. During evacuation of the vacuum packaging bag, primary channels 28 enable effective evacuation of the vacuum packaging bag. The primary channels 28 tend to prevent gas from being trapped due to stored product and the collapse of the vacuum packaging bag. In one embodiment, the pattern of the protruding structures 22 is formed only on the inner layer of vacuum packaging bag through a hot casting process, described in more detail below.

The walls 24 create an open ended internal cavity 26 within each protruding cavernous structure 22. The plurality of internal cavities 26 may be useful for capturing fluids. While it is desirable to evacuate gases from the vacuum packaging bag to improve preservation, typically fluids are best left remaining in the vacuum packaging bag.

Figure 3:
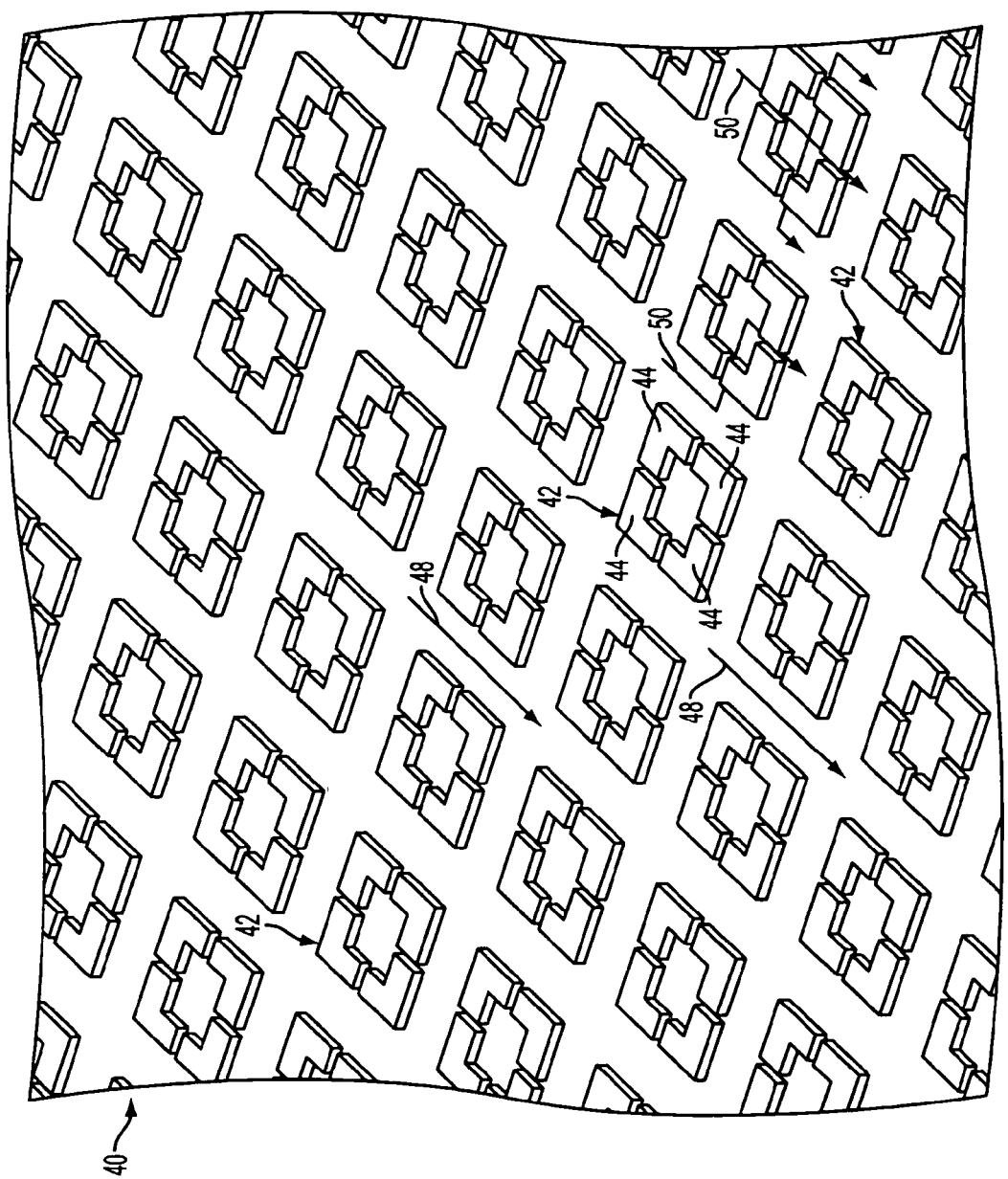
FIG. 3 illustrates a patterned film in accordance with a third embodiment of the present invention.

FIG. 3 illustrates a patterned film 40 according to another embodiment of the present invention. The patterned film 40 is formed with a plurality of protruding cavernous structures 42. Each of these protruding cavernous structures 42 are rectangular in a shape formed by walls 44. The protruding structures 42 of FIG. 3 are shown having a rectangular shape. While the rectangular shape is suitable, its presentation here is for purposes of example. Other shapes such as cylindrical, rhomboid, etc., or even irregular will suffice to accomplish the desired goal of forming channels during evacuation.

During evacuation of the vacuum packaging bag, primary channels such as 48 are formed external to the protruding cavernous structures 42 and secondary channels such as 50 are formed through the walls 44 and internal to the protruding cavernous structures 42. Note that the exact location of the secondary channels 50 is not paramount, as will be seen below in FIGS. 4-5. The channels 48 and 50 enable effective evacuation of the vacuum packaging bag, as they tend to prevent gas from being trapped due to stored product blockage and the collapse of the vacuum packaging bag. In one embodiment, the pattern of the protruding cavernous structures 42 is formed only on the inner layer of vacuum packaging bag through a hot casting process, described in more detail below.

With further reference to FIG. 3, the walls 44 create an open ended internal cavity 52 within each protruding cavernous structure 42. The secondary channels 50 allow evacuation through the internal cavities 52; however some fluid may still be trapped in the internal cavities 52, thereby tending to generate a better evacuation process.

Figure 4:
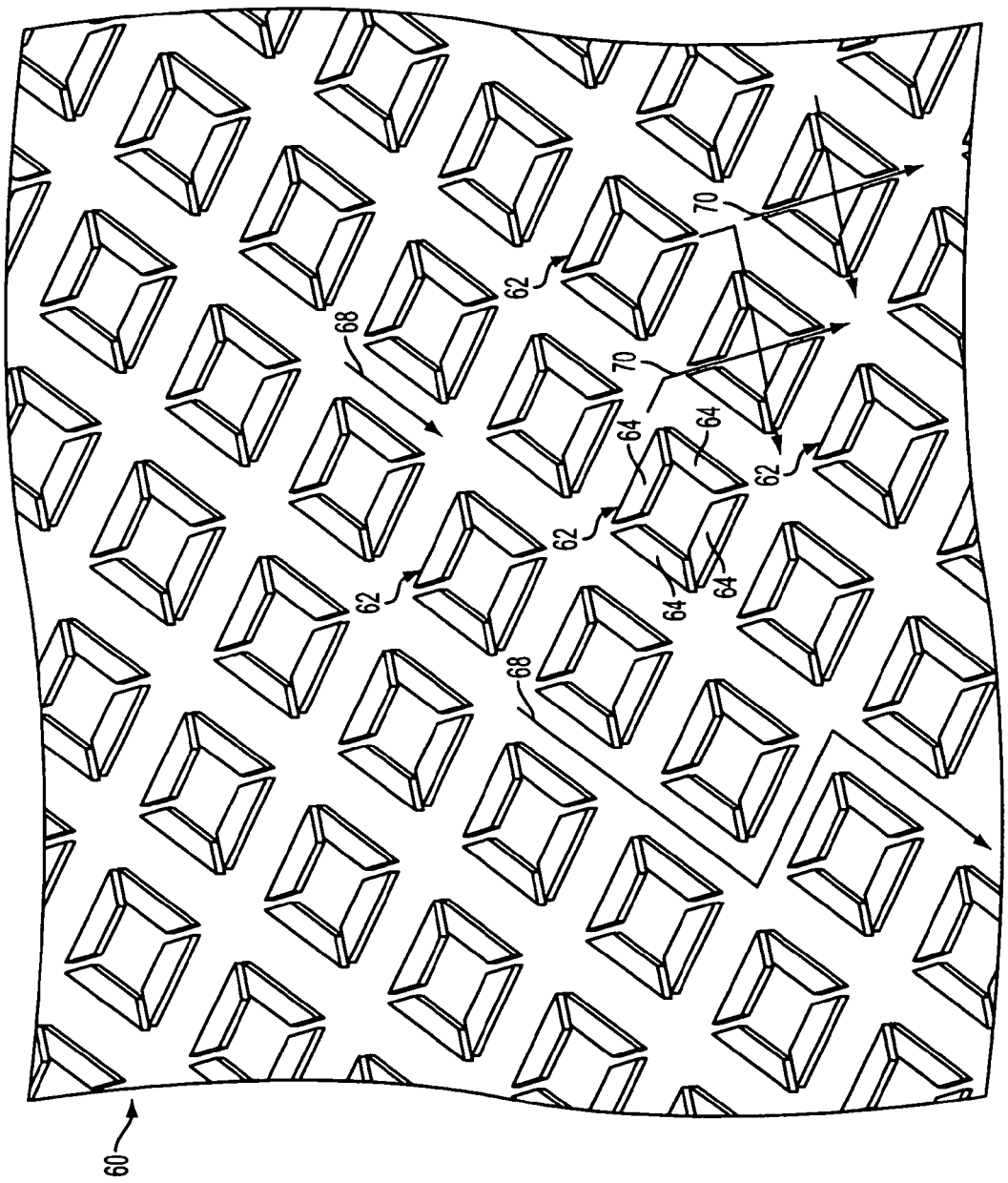
FIG. 4 illustrates a patterned film in accordance with a fourth embodiment of the present invention.

FIG. 4 illustrates a patterned film 60 according to another embodiment of the present invention. The patterned film 60 is formed with a plurality of protruding cavernous structures 62. Each of these protruding cavernous structures 62 are rectangular in a shape formed by walls 64. The protruding structures 62 of FIG. 4 are shown having a rectangular shape. While the rectangular shape is suitable, its presentation here is for purposes of example. Other shapes such as cylindrical, rhomboid, etc., or even irregular will suffice to accomplish the desired goal of forming channels during evacuation.

During evacuation of the vacuum packaging bag, primary channels such as 68 are formed external to the protruding cavernous structures 62 and secondary channels such as 70 are formed through the walls 64 and internal to the protruding cavernous structures 62. Note that the exact location of the secondary channels 70 is not paramount. The channels 68 and 70 enable effective evacuation of the vacuum packaging bag, as they tend to prevent gas from being trapped due to stored product blockage and the collapse of the vacuum packaging bag. In one embodiment, the pattern of the protruding cavernous structures 62 is formed only on the inner layer of vacuum packaging bag through a hot casting process, described in more detail below.

With further reference to FIG. 4, the walls 64 create an open ended internal cavity 72 within each protruding cavernous structure 62. The secondary channels 70 allow evacuation through the internal cavities 72; however some fluid may still be trapped in the internal cavities 72, thereby tending to generate a better evacuation process.

Figure 5:
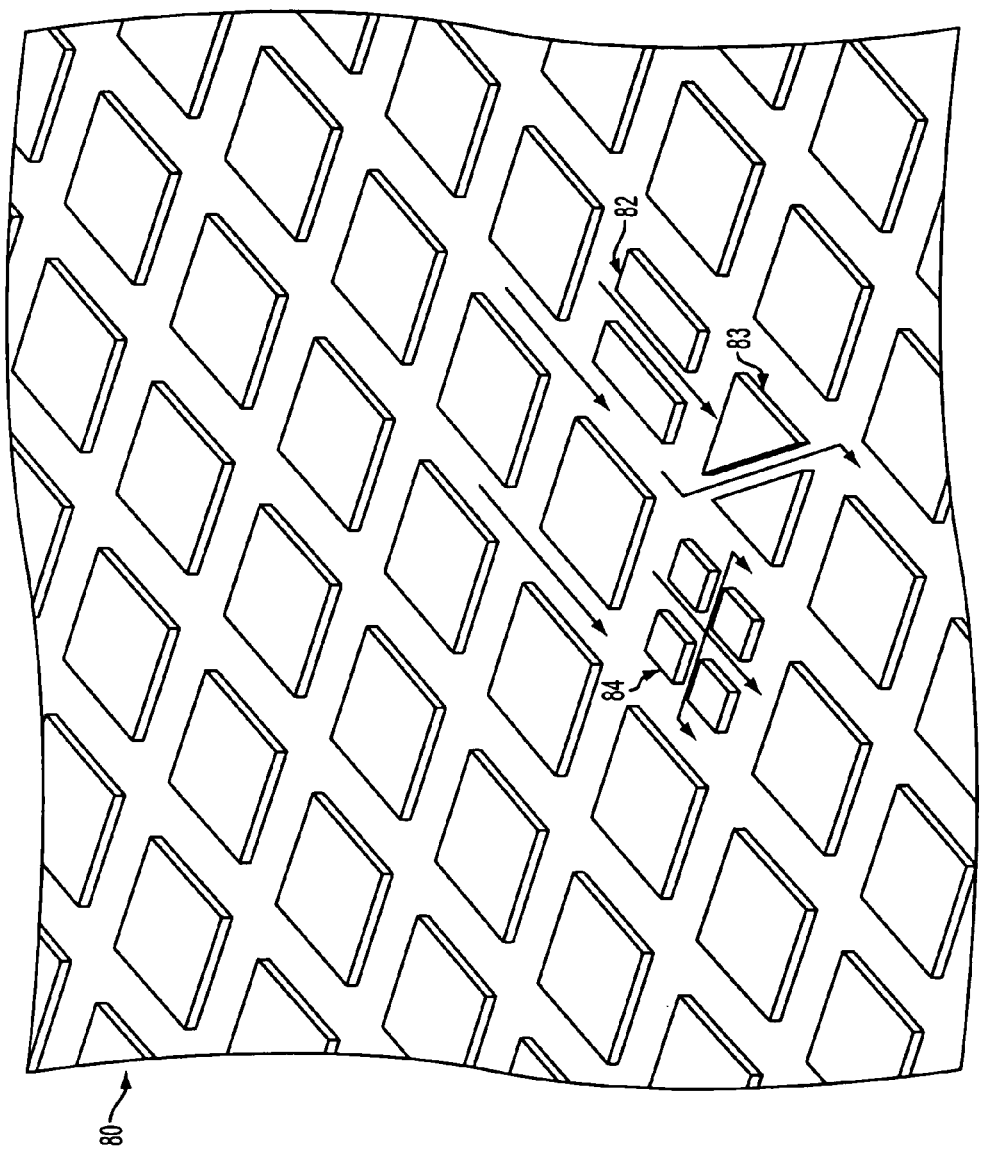
FIG. 5 illustrates a patterned film in accordance with a fifth embodiment of the present invention.

FIG. 5 illustrates a patterned film 80 according to another embodiment of the present invention. The patterned film 80 is formed with a plurality of protruding cavernous structures such as structures 81-83. Each of these protruding cavernous structures 82 are rectangular in a shape formed by walls.

The variety of protruding cavernous structure shown in FIG. 5 serve to illustrate the principal that any cavity creating a channel through a protruding structure will serve to create the desirable secondary channels taught by one aspect of the present invention. Again, while the rectangular shape is suitable, its presentation here is for purposes of example. Other shapes such as cylindrical, rhomboid, etc., or even irregular will suffice to accomplish the desired goal of forming channels during evacuation.

Figure 6A:
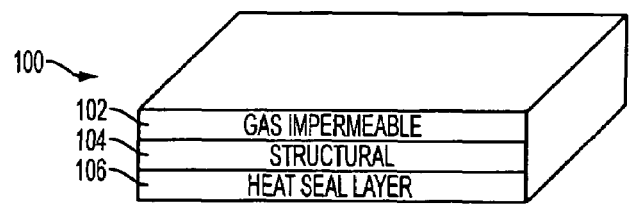
FIGS. 6A-6B illustrate top and bottom isometric views of a patterned film according to one aspect of the present invention.
Figure 6B:
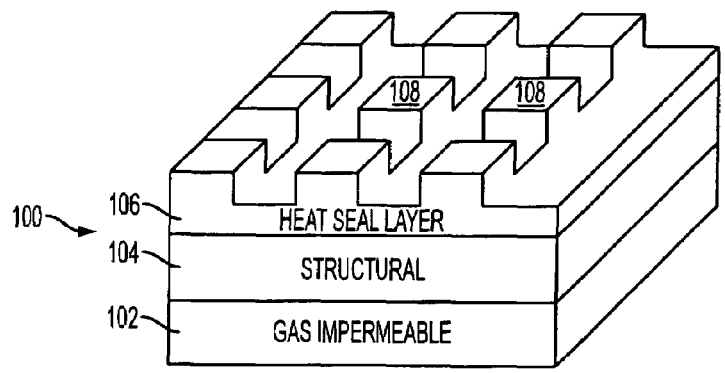

FIGS. 6A-6B provide an isometric illustration of a multi-layer film 100 in accordance with one embodiment of the present invention. The multi-layer film 100 includes a gas impermeable layer 102, a structural layer 104, and a patterned heat-seal layer 106. As seen in FIG. 6A, the gas impermeable layer has a substantially flat surface, at least from a macroscopic viewpoint. In contrast, the patterned heat-seal layer 106 has a plurality of structural protrusions 108. The structural protrusions 108 may take any suitable form such as the protrusions of FIG. 1 and cavernous protrusion described above with reference to FIGS. 2-5.

As will be appreciated, the embodiments of FIGS. 6A-6B is merely illustrative. The present invention contemplates a variety of multi-layer films made from a variety of materials particularly nylon materials, including, but not limited to, polyester, polypropylene, and ethylene vinyl acetate, and with different combinations of layers as required by the specific application. One apparatus and process for manufacturing such a film is described below with reference to FIG. 10.

Figures 7, 8, 9:
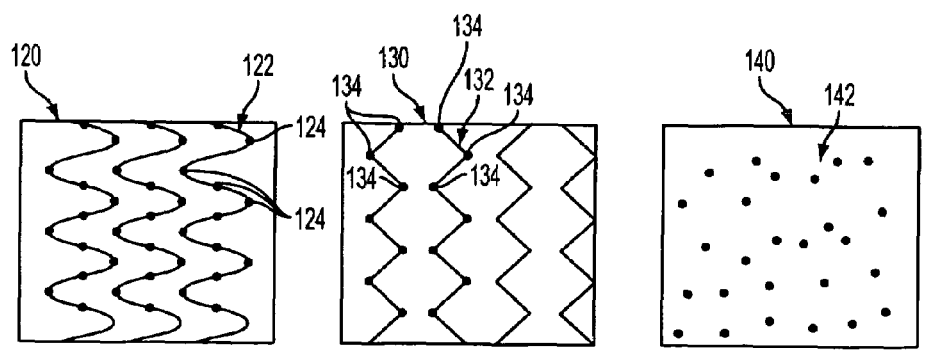
FIGS. 7-9 illustrate three example pattern layouts according to another aspect of the present invention.

FIGS. 7-9 illustrate three possible pattern layouts 120, 130, and 140. The pattern layout 120 is wave or sinusoidal form 122 upon which a plurality of protruding structures 124 are disposed. The pattern layout 130 is an opposing zigzag pattern 132 upon which a plurality of protruding structures 134 are disposed. The pattern layout 140 is an irregular or pseudo-random pattern 142 upon which a plurality of protruding structures 144 are disposed. As will be appreciated, the three layouts of FIGS. 7-9 provide example layouts and a variety of layouts will result in the desired formation of evacuation channels.

The present invention contemplates vacuum packaging films that may seal into bags through a variety of mechanisms. For example, the bag material itself may include one or more heat sealable layers. As described below with reference to FIGS. 10-11, the bag material may be pealably heat sealable (easy to peal) and even capable of being both pealably sealable and permanently sealable. Alternatively, the bag may be heat sealed on one or more sides, and closed by some other mechanism such as a zipper or ziplock mechanism on the other sides.

Figure 10:
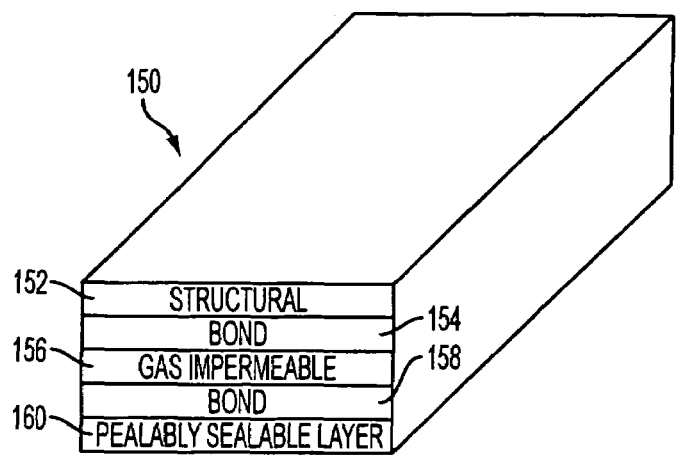
FIG. 10 is a cross-section of a film suitable for forming a pealably sealable vacuum packaging bag in accordance with one embodiment of the present invention.

FIG. 10 illustrates a multi-layer film 150 according to another embodiment of the present invention. The film 150 includes a structural layer 152, a bonding layer 154, a gas impermeable layer 156, a bonding layer 158, and a pealably sealable layer 160. Bond layers 154 and 158 act to laminate opposing layers. The structural layer 152 provides strength to the film 150 so that it is particularly useful as a vacuum packaging bag material. The gas impermeable layer 156 tends to inhibit gas flow across the film 10.

The pealably sealable layer 160 includes a resin or other material that through pressure, heat or other sealing enabler, will form a pealable seal. The pealable seal will be capable of holding a vacuum level in an evacuated bag, yet will be manually pealable by a user. In certain embodiments, the vacuum internal to the bag will tend to maintain the seal, thus making this operation even easier. In other embodiments, the pressure arising from the internal vacuum is sufficient to maintain the pealable seal. In preferred embodiments, the pealably sealable layer will have a pattern of protruding structures formed thereon.

A variety of materials are well suited for the material of the pealably sealable layer 160. For example, the material of pealably sealable layer 160 may include polyethylene, polyester, ethylene vinyl acetate, etc., and resins thereof. Typical vacuum packaging appliances operate their heat sealing mechanisms in temperature ranges of 100 degrees Celsius to 200 degrees Celsius. Therefore certain embodiments of the present invention teach materials which will form the pealably sealable bond within that temperature range. Other embodiments of the present invention teach materials which pealably seal within ranges outside current appliances. In these embodiments, the home vacuum packaging appliances must be designed accordingly.

The present invention also contemplates forming the pealably sealable layer 160 out of material that may form a permanent seal under a first set of conditions, and a pealable seal under a second set of conditions. For example, the material may form a pealable seal under sealing pressure and temperature conditions of the typical home vacuum packaging appliance. Under more extreme pressure and/or temperature conditions, the material of this embodiment forms a permanent bond. This is useful in that bags and bag rolls with preformed permanent seals can be manufactured and sold to the consumer. The consumer in turn can form the final fourth seal with a pealably sealable bond using a standard appliance. This is preferable in certain circumstances, as only one pealable seal is necessary for easy access to the content of the bag.

Figure 11:
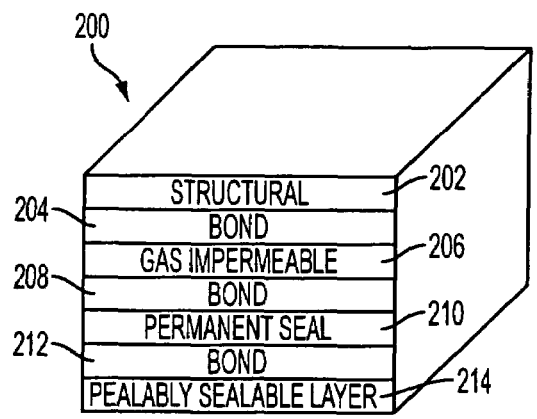
FIG. 11 is a cross-section of another film suitable for forming a pealably sealable vacuum packaging bag in accordance with yet another embodiment of the present invention.

FIG. 11 illustrates a multi-layer film 200 in accordance with another embodiment of the present invention. The film 200 includes a structural layer 202, a bond layer 204, a gas impermeable layer 206, a bond layer 208, a permanent sealing layer 210, a bond layer 212, and a pealably sealable layer 214. As described above with reference to FIG. 10, under certain circumstances there are advantages to having a film with permanent sealing capabilities. The film 200 includes the permanent sealing layer 210 that under certain conditions can be used to generate a permanent bond.

Those skilled in the art will recognize that the pealably scalable films of the present invention may be beneficially designed with patterns therein or upon. As described in much detail above, patterned film has the property of tending to form air channels during evacuation of a bag made from such patterned material, the air channels tending to improve evacuation of these bags. Suitable patterns include, but are not limited to, waffle-shaped, straight-lined, zigzag, speckled, criss-crossed, and random patterns.

Extrusion processes such as may form the multi-layer films described below with reference to FIG. 13, or through embossing. Suitable patterns, as well as extrusion and embossing processes, are described in more detail in Wu's commonly assigned patent application entitled FORMING EVACUATION CHANNELS DURING SINGLE AND MULTI-LAYER EXTRUDING PROCESSES, filed Mar. 15, 2004, bearing application Ser. No. 10/801,950, and incorporated by reference in its entirety.

Figure 12:
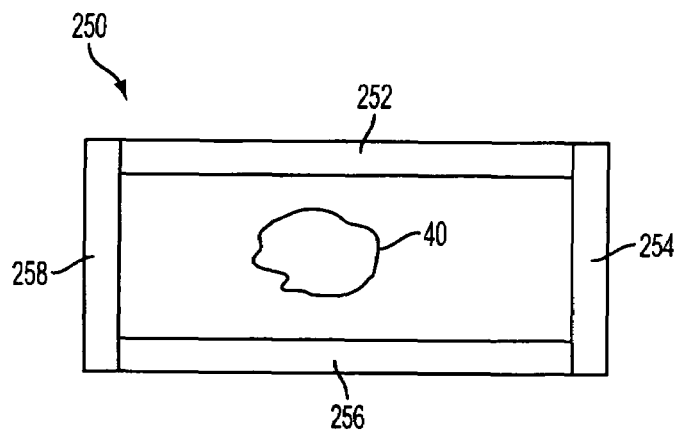
FIG. 12 is a top view of a sealed vacuum packaging bag according to one embodiment of the present invention.

FIG. 12 illustrates a vacuum packaging bag 250 storing product 40 in accordance with one embodiment of the present invention. The bag 250 has been evacuated and seals 252-258 have been formed. Depending upon the application and the film used for the bag material, at least one of the seals 252-258 is a pealable seal. The other seals may be formed as permanent seals, if the film and available equipment permits, and may also be formed as pealable seals. The bag 250 has at least one inner surface patterned with a plurality of protruding structures such as those described above with reference to FIGS. 1-9.

Figure 13:
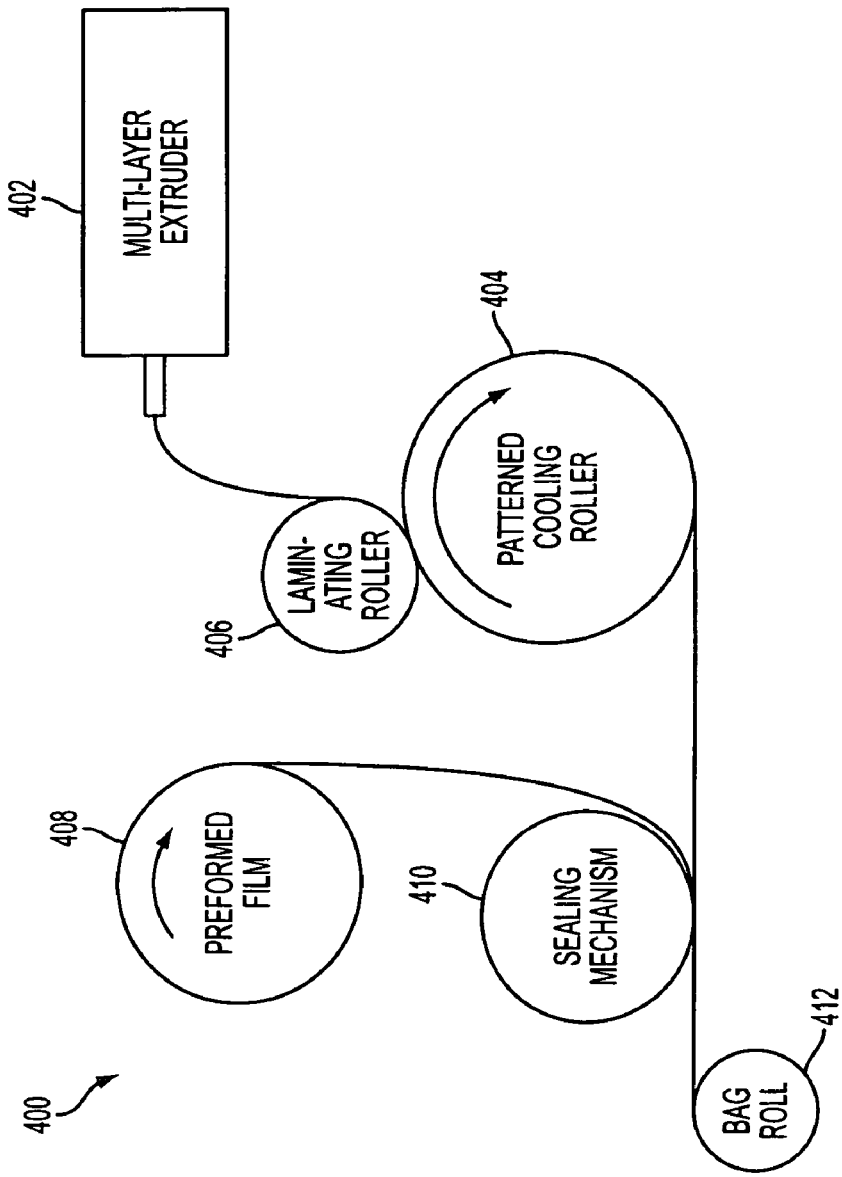
FIG. 13 is an apparatus for manufacturing a roll of patterned sealable bag material.

FIG. 13 illustrates an apparatus 400 for manufacturing bag material in accordance with one embodiment of the present invention. The apparatus 400 includes a multi-layer extruder 402 for extruding a first film sheet, a patterned cooling roller 404, a laminating roller 406, a second film source 408 providing a second film sheet, a sealing mechanism 410, and a bag roll 412 (also shown in FIG. 14).

The multi-layer extruder 402 extrudes one or more materials for forming the bag material. This may include heat-sealable material, pealably sealable material, structural material and/or gas impermeable material.

The patterned cooling roller 404 forms a pattern on the bag material that causes air channels to form during and aid in evacuation of the bag. The pattern follows any of those patterns described above with reference to FIGS. 1-9 as well as other suitable embodiments. The laminating roller 406 applies the extruded material onto the cooling roller 404 so that the pattern is properly formed on the bag material. Alternatively, other mechanisms such as an airknife or a vacuumed roller may form the pattern.

Figure 14:
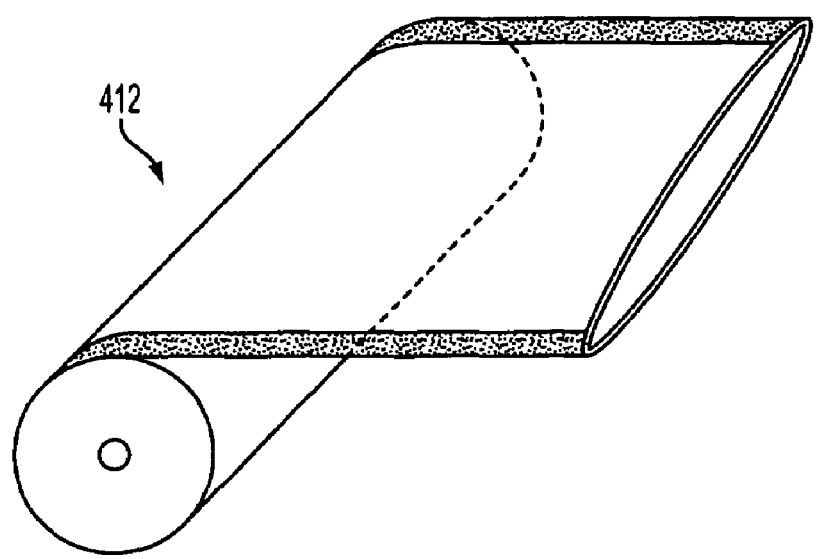
FIG. 14 is an isometric view of a roll of patterned bag material produced by the apparatus of FIG. 13 according to still another embodiment of the present invention.

The preformed film source 408 is a source of film for the second sheet of the bag material. The source 408 may be another extruding mechanism, cooling roller, etc., or may simply be a roll of already formed film. The second sheet of film may or may not be patterned. The heat sealing mechanism 410 is arranged to bond the first and second sheets of film on outer opposing edges. The bag material formed on bag roll 412 is a roll of bag material having seals on opposing sides. FIG. 14 is an isometric view of the roll of patterned bag material produced by the apparatus of FIG. 13 according to still another embodiment of the present invention. The seals may be permanent seals or pealably sealable, depending upon the film material, the conditions imposed by the sealing mechanism, etc. The bag material is later cut up into bag pouches either by the consumer, or at a next stage of manufacturing for generating preformed bags for the user.

Figure 15:
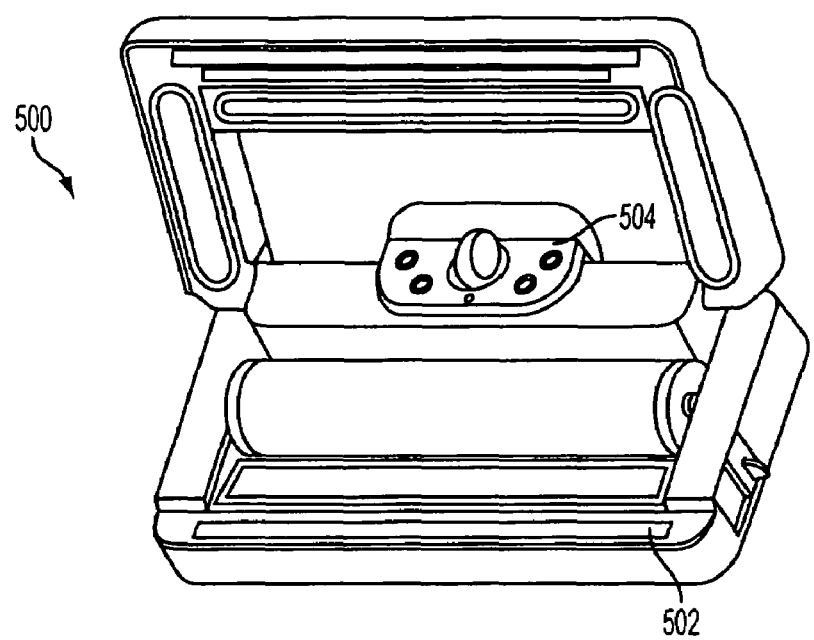
FIG. 15 is an isometric view of a vacuum packaging appliance in accordance with another embodiment of the present invention.

FIG. 15 is an isometric view of a vacuum packaging appliance 500 in accordance with one embodiment of the present invention. Operation and manufacture of such appliances are well known in the art. The appliance 500 includes a heat-sealing mechanism 502 and a control panel 504. The appliance 500 is well suited for use with a film of the present invention having a heat sealable layer.

What is claimed is:

1. A vacuum packaging bag for holding food or other product, said vacuum packaging bag comprising:
   a first sheet formed of a multi-layer plastic film, said multi-layer plastic film including:
      a patterned inner layer having a plurality of cavernous structures, said cavernous structures arranged in a first pattern to form channels suitable for evacuation of gas; and
      an outer layer coupled with said patterned inner layer, said outer layer
      having a substantially flat outer surface;
   a second sheet having a footprint similar to said first sheet; and
   said first and second sheets arranged with said patterned inner layer inside and facing said second sheet, said first and second sheets scaled on opposing lateral sides and at an end side,
   whereby said first and second sheets form said vacuum packaging bag having an opening for insertion of food or other product; and
   wherein said cavernous structures are each essentially a four walled rectangular structure forming a rectangular cavity, said four walled rectangular structure having at least one channel from an outside of the walled rectangular structure into said rectangular cavity.

2. A vacuum packaging bag as recited in claim 1, wherein said at least one channel from an outside of the walled rectangular structure into said rectangular cavity comprises a channel through each wall from an outside of the walled rectangular structure into said rectangular cavity.

3. A vacuum packaging bag as recited in claim 1, wherein said at least one channel from an outside of the walled rectangular structure into said rectangular cavity comprises a channel through each corner from an outside of the walled rectangular structure into said rectangular cavity.

4. A vacuum packaging bag as recited in claim 1, wherein said protruding cavernous structures each form a single cavity.

5. A vacuum packaging bag as recited in claim 4, wherein each protruding cavernous structure has at least one channel connecting an outside of said cavernous structure to said single cavity.

6. A vacuum packaging bag as recited in claim 1, wherein said first sheet is made from nylon material.

7. A vacuum packaging bag as recited in claim 6, wherein said nylon material includes a polyester.

8. A vacuum packaging bag as recited in claim 6, wherein said nylon material includes a polypropylene.

9. A vacuum packaging bag as recited in claim 6, wherein said nylon material includes a ethylene vinyl acetate.

10. A vacuum packaging bag as recited in claim 1, wherein said first and second sheets are beat-sealable, whereby said opening can be closed through a heat-sealing process.

11. A vacuum packaging bag as recited in claim 1 further comprising a mechanical scaling mechanism adjacent to said opening, whereby said opening can he hermetically sealed.

* * * * *